Patented Nov. 18, 1924.

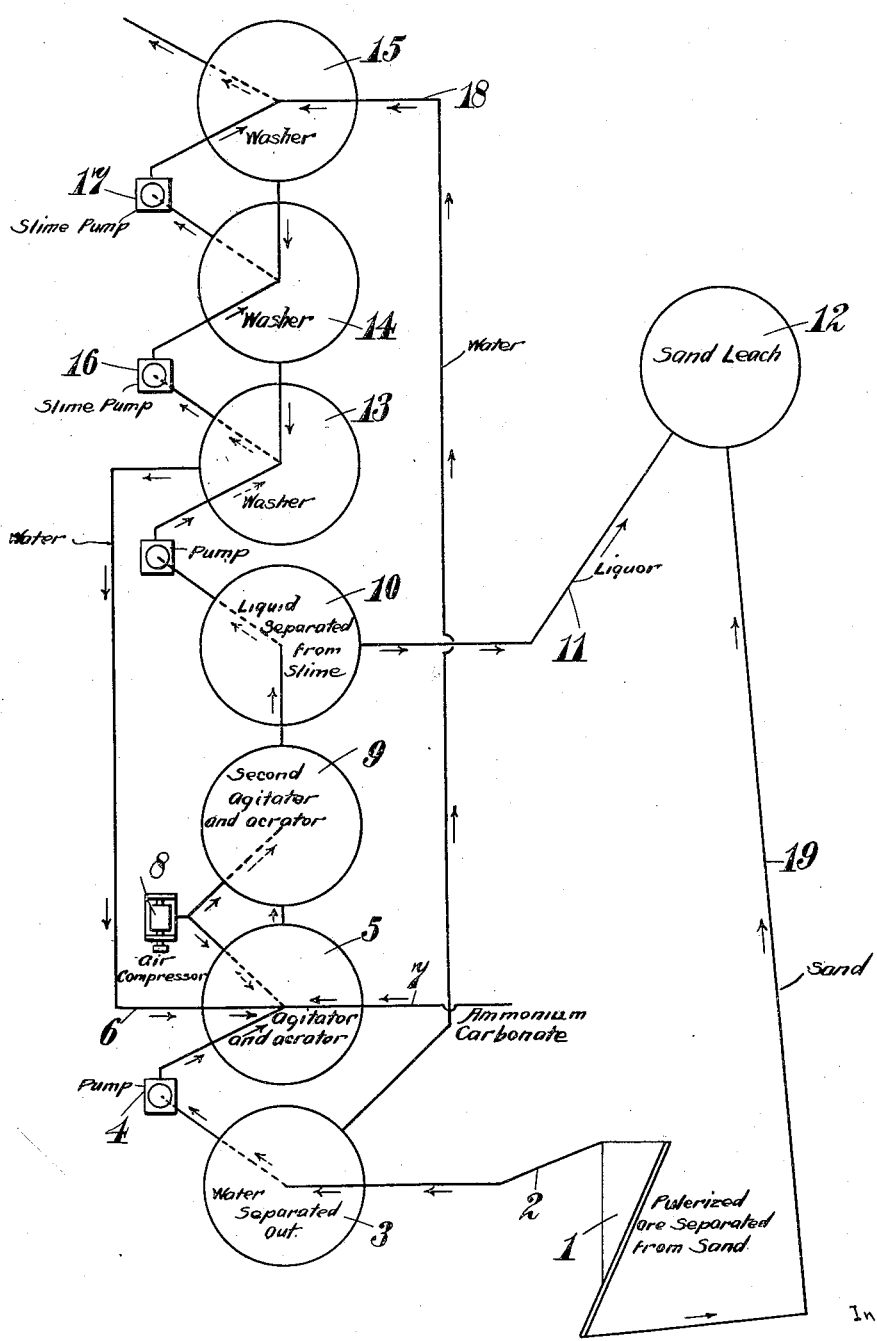

1,516,356

UNITED STATES PATENT OFFICE.

THOMAS JAMES TAPLIN, JR., OF LONDON, ENGLAND, ASSIGNOR TO METALS PRODUCTION COMPANY OF NORTH AMERICA INCORPORATED, OF NEW YORK, N. Y.

LEACHING OF ORES CONTAINING SLIMES.

Application filed November 5, 1923. Serial No. 672,836.

*To all whom it may concern:*

Be it known that I, THOMAS JAMES TAPLIN, Junior, a subject of the King of England, residing at London, in England, have invented certain new and useful Improvements in the Leaching of Ores Containing Slimes, of which the following is a specification.

This invention consists in improvements in or relating to the leaching of ores containing slimes, and it has particular relation to the leaching of copper ores in the process set forth in prior U. S. Patent Specifications No. 1,440,186, Serial No. 580,298 and Serial No. 628,033.

In the leaching of copper ores by means of ammoniacal solutions the metal is recovered as oxide from the solutions after the leaching operations by boiling out the ammonia, and for the sake of economy in the boiling-out operation it is desirable that the liquors resulting from the leaching process should be as rich as possible in metallic contents. Thus, including the amount of the wash water which carries values and is admixed with the solvent liquor it will be evident that there is a maximum permissible amount of liquor which can be used in conjunction with a given weight of ore.

The treatment of slimes when these are present in the ore to be leached may in some cases introduce difficulties, because if these are allowed to remain mixed with the coarser material they may clog it and prevent percolation, while if they are treated separately it is difficult to free the slimes from liquor below an amount approximately equal in weight to the weight of the slimes. Thus in order to leach slimes effectively it is necessary to employ a sufficient quantity of water to ensure that only a weak solution ultimately remains in the slimes.

According to the present invention, a leaching process employing an ammoniacal solvent for ores containing slimes is characterized by first separating the slimes and leaching them by suspending them in a large proportion of the total leaching liquor required for the process with accompanying aeration, and subsequently using the same liquor for leaching the sands, so that the slimes are leached in a sufficiency of liquor which is at the same time converted into a solvent suitable for the sands.

In this way, the slimes (which may run to say 20% of the weight of the ore) are treated with a sufficiency of liquor and a weak solution of copper is obtained in the first instance, whereby loss of metal or ammonia in the water carried away with the slimes is reduced. The ammoniacal pulp is aerated, with the result that as fast as the copper is dissolved, it is converted into the cupric condition. The liquor removed from the slimes has thus been rendered especially suitable for attacking the metal during percolation through the sands, because the cupric ammonium carbonate formed in the solution is an effective solvent of copper, while a solution of ammonium carbonate is not an effective solvent in the absence of oxygen.

During the leaching of the sands by the liquor removed from the slimes, additional ammonium carbonate being added if necessary, the copper content of the solution is raised to a value suitable for economic evaporation.

Preferably, in order further to diminish the loss of metal in the tailings from the slime leaching, the slimes, after leaching, are separated from the main body of the liquor in which they have been leached, are washed by suspending them in water, and this water (which carries certain values) is subsequently used after the addition of the necessary reagents for making the leaching liquor for further leaching a fresh batch of slimes.

One example of carrying out the present invention will now be described with reference to the accompanying drawing, which is a flow-sheet or diagram indicating the order of operations.

Assuming that the ore contains say 5% of values, if the resulting solution is desired to contain 5% of values it is evident that the weight of the whole of the water used in the operations, including the wash water, must not exceed the weight of the ore. The ore in a suitable state of division may be made into an aqueous pulp and then passed through a wet classifier of any desired type indicated diagrammatically at 1 in the drawing so that the slimes are separated from the sand. The slime, comprising say 20% of the weight of the ore, passes as shown by the line 2 with the water to a thickener 3 where it is separated from the bulk of its contained water and is drawn by a pump 4, in the form of a pulp, containing about equal parts of slime and water, into an agitator 5.

The agitator 5 consists of a vessel provided with means for introducing air into the pulp, such for example as a Pachuca tank or mechanical stirrer producing vigorous agitation. An air compressor is indicated at 8. In the agitator 5 the slimes are mixed with liquor 6 resulting from the washing of previous batches of slimes, with the addition of ammonium carbonate at 7. The slimes and liquor may be passed through a second agitator 9 in series with the first, and thence to a thickener 10 where the slime is separated from the liquor, again in the form of a pulp, and the liquor is passed on as shown by the line 11 to the sand-leaching plant 12 which receives and treats the sands 19 from the classifier 1. The slimes are passed to other vessels 13, 14, 15 where they are washed in water (which may consist of the water from the classifier 1 which was previously separated from the slime in the thickener 3). The amount of this wash water is adjusted so as to be slightly less than the amount required in the agitators 5, 9, 10 for the leaching liquor. (The wash water is subsequently passed into these agitators and is made up to volume by the water introduced with the ammonia at 7). The slimes are passed through several washing vessels in succession, as indicated. These vessels 13, 14, 15 take the form of thickeners so that the slimes are washed by stirring them in suspension in the wash water, and the slime is removed continuously on thickening out or settling at the bottom of the vessels. Thus the slime pulp passes from the vessel 13 through a pump 16 to the vessel 14 and thence through a pump 17 to the vessel 15, and thence to waste as tailings. The wash water, derived from the thickener 3, passes as indicated at 18, first into the vessel 15 and thence successively through 14 and 13, whence it flows as already described to the agitator 5.

The untreated sands 19 from the classifier are passed into the sand-leaching plant 12. The sands are there treated with the water 11 from the slime leaching agitators, with introduction of more ammonia is required. A certain proportion of water is used as wash water in the sand-leaching plant and admixed with the solution from the leaching of the slimes; this must be allowed for in calculating the amount of water which can be devoted to the leaching of the slimes.

What I claim as my invention and desire to secure by Letters Patent is:—

1. In a leaching process for ores containing slimes associated with coarser material, the steps which consist in first separating the slimes, leaching them by suspending them in a large proportion of the total leaching liquor required for the process and subsequently using the same leaching liquor for leaching the coarser material.

2. In a leaching process employing an ammonical solvent for copper ores containing slimes, the steps which consist in first separating the slimes, leaching them by suspending them in a large proportion of the total leaching liquor required for the process, and subsequently using the same liquor for leaching the coarser material.

3. In a leaching process employing an ammoniacal solvent for copper ores containing slimes, the steps which consist in first separating the slimes, leaching them by suspending them in a large proportion of the total leaching liquor required for the process with accompanying aeration, and subsequently using the same liquor for leaching the coarser material.

4. In a leaching process employing an ammoniacal solvent for copper ores containing slimes, the steps which consist in first separating the slimes from the sands, leaching them by suspending them in a large proportion of the leaching liquor required for the process, separating the slimes from the said leaching liquor and causing the said leaching liquor to percolate through the sands.

5. In a leaching process employing an ammoniacal solvent for copper ores containing slimes, the steps which consist in first separating the slimes from the coarser materials, leaching them by suspending in a large proportion of the liquid required for the process, separating the slimes from this liquor, utilizing the said liquor for leaching the sands, suspending the slimes in water so as to wash them and subsequently using this water for making the leaching liquor for further leaching a fresh batch of slimes.

6. In a leaching process employing an ammoniacal solvent for copper ores containing slimes, the steps which consist in first separating the slimes from the coarser materials, leaching them by suspending in a large proportion of the liquid required for the process with accompanying aeration, separating the slimes from this liquor, utilizing the said liquor for leaching the sands, suspending the slimes in water so as to wash them and subsequently using this water for making the leaching liquor for further leaching a fresh batch of slimes.

In testimony whereof I affix my signature.

THOMAS JAMES TAPLIN (Junr).